Aug. 26, 1952     F. E. HAWKINS ET AL     2,608,598
                    MOTOR-IN-WHEEL DRIVE

Filed July 22, 1950                         6 Sheets-Sheet 1

INVENTORS;
FREDERICK E. HAWKINS
ROBERT LAPSLEY
GEORGE L. TURNER
BY
        ATTYS.

Aug. 26, 1952   F. E. HAWKINS ET AL   2,608,598
MOTOR-IN-WHEEL DRIVE

Filed July 22, 1950   6 Sheets-Sheet 4

INVENTORS.
FREDERICK E. HAWKINS
ROBERT LAPSLEY
GEORGE L. TURNER
BY
ATTYS.

Aug. 26, 1952   F. E. HAWKINS ET AL   2,608,598
MOTOR-IN-WHEEL DRIVE
Filed July 22, 1950   6 Sheets-Sheet 6
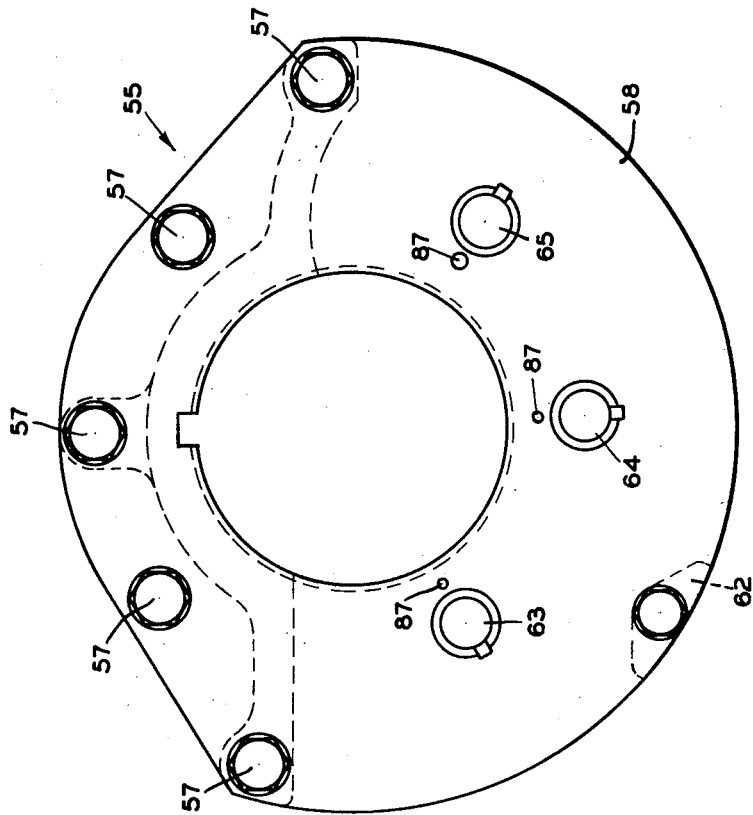
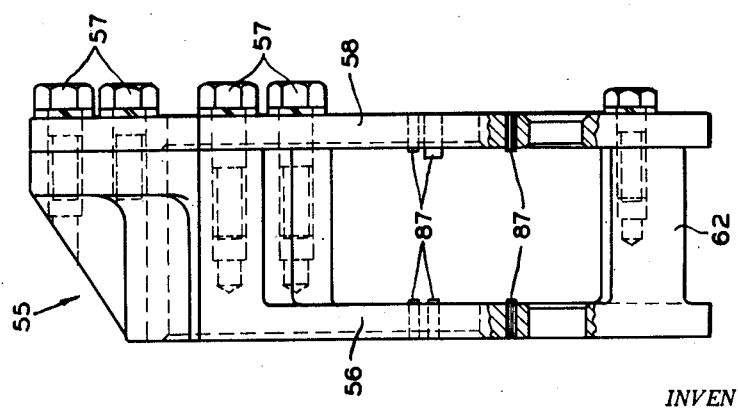
INVENTORS.
FREDERICK E. HAWKINS
ROBERT LAPSLEY
GEORGE L. TURNER
BY
ATTYS.

Patented Aug. 26, 1952

2,608,598

UNITED STATES PATENT OFFICE 2,608,598

MOTOR-IN-WHEEL DRIVE

Frederick E. Hawkins, Niles, Robert Lapsley, Berrien Springs, and George L. Turner, Buchanan, Mich., assignors to Clark Equipment Company, Buchanan, Mich., a corporation of Michigan Application July 22, 1950, Serial No. 175,376

17 Claims. (Cl. 172—36)

Our invention relates to a combination motor and drive means disposed within a wheel for driving the latter.

It is an object of our invention to provide a compact combination motor and drive means which may be disposed within a wheel for driving the latter.

We propose to provide a prime mover, as, for example, an electric motor, having an outer casing to which is secured a pair of end cap members, one at each end thereof, and each having portions extending axially of the armature shaft of the motor. Disposed about the casing of the prime mover in concentric relation thereto is a wheel housing having end closure members which are rotatably journaled on the axially extending portions of the cap members at the ends of the motor casing. The armature shaft extending axially outwardly of the casing of the electric motor in the specific embodiment, herein disclosed, of our invention, serves as an output shaft which, through suitable drive means, is adapted to effect rotation of the rotatable wheel housing when the end cap members of the motor casing are held rigid. Mounted to the outer periphery of the rotatable wheel housing, intermediate of the ends thereof, is a tire assembly through which drive is adapted to be effected to the ground.

It is another object of our invention to provide support means for the end cap members of the prime mover, of a character which will permit the combination motor and drive means to be removed easily from the support means for servicing.

We propose to provide a pair of vertically extending spaced apart plate members which are secured at their upper ends to a common horizontally extending frame member. One of the cap members for the prime mover has formed adjacent its outer end an annular bead which is adapted to seat within an opening formed in one of the plate members. The other of the end cap members has formed in its outer end an axially extending opening, which opening is adapted to receive the reduced end portion of a pilot shaft. The pilot shaft has an intermediate portion which is disposed within an opening formed in the other plate member, and has an enlarged flange portion which is adapted to be secured to the outer face of the plate member. It will be observed that the above described support means permits the combination motor and drive means to be removed easily from the support means for servicing. That is, by removing the pilot shaft from the other end cap member, the motor and drive means construction may be shifted axially permitting the bead portion of the one end cap member to be withdrawn from the associated opening in the adjacent plate member.

It is a further object of our invention to provide an end cap member adjacent one end of the motor casing which will permit power lines to be lead therethrough, into the rotatable wheel housing for supplying power to the prime mover.

We have formed a central cavity within the one end cap member, which cavity opens, through radially extending openings, inwardly of the rotatable wheel housing. The power lines are then lead through the opening in the one plate member, the cavity and radially extending openings in the one end cap member, and then into the interior of the rotatable wheel housing. The power lines are suitably connected to the prime mover for supplying power thereto.

It is a further object of our invention to provide drive means between the output shaft of the prime mover and the rotatable wheel housing which will effect a substantial speed reduction therebetween, and a drive means having a minimum axial and radial extent.

The other end cap member, for supporting the prime mover, comprises two coaxial spaced apart cylindrical portions interconnected by an integral web portion. Disposed about the end cap member is a substantially U-shaped inverted frame member with the bight portion thereof fixed to the web portion of the cap member. A pinion is secured to the output shaft of the prime mover, intermediate of the legs of the U-shaped frame member. Three parallel spaced apart lay shafts have their ends journaled in the legs of the U-shaped frame member. The first lay shaft lies below a horizontal median plane passing through the output shaft at one side of a vertical median plane passing through the output shaft; the second lay shaft lies below the horizontal median plane in the vertical median plane; and the third lay shaft lies below the horizontal median plane, at the opposite side of the vertical median plane as the first lay shaft. A first compound gear is journaled on the first lay shaft and has a first gear portion which meshes with the pinion on the output shaft. A second compound gear is journaled on the second lay shaft, and has a first gear portion which meshes with a second gear portion of the first compound gear. A gear is journaled on the third lay shaft and meshes with a second gear portion of the second compound gear and with an internal ring gear carried by the rotatable wheel housing.

It is still a further object of our invention to provide a chamber adjacent one end of the rotatable wheel housing wherein the drive means may be disposed.

We propose to accomplish the above object by providing a radially inwardly extending flange adjacent one end of the rotatable wheel housing, which flange preferably is formed integral therewith. The flange is axially spaced from the adjacent end closure member of the rotatable wheel housing, and the flange, together with the end closure member, defines a chamber which encloses the drive means, thus permitting the latter to be run in a bath of oil.

It is a still further object of our invention to provide mounting means for the ring gear, whereby the latter may be rigidly and easily secured to the rotatable wheel housing.

We propose to provide a rotatable wheel housing comprising a cylindrical portion having an inwardly facing annular groove formed in the end thereof, which annular groove is adapted to receive the ring gear. The ring gear is maintained in the annular groove by an end closure member, which, in turn, is secured to the cylindrical portion of the rotatable wheel housing by means of a plurality of circumferentially spaced bolts. To hold the ring gear against rotation, with respect to the rotatable housing, circumferentially spaced notches are formed in the outer periphery thereof, which notches are adapted to align with the bolts holding the end closure member to the rotatable wheel housing.

Now, in order to acquaint those skilled in the art with the manner of constructing and using devices in accordance with the principles of our present invention, we shall describe, in connection with the accompanying drawings, a preferred embodiment of our invention.

In the drawings:

Figure 6 is a side elevational view of the substantially U-shaped inverted frame member provided for supporting the drive means of our present invention; and Figure 7 is a front view of the frame member of Figure 6.

Figure 1:
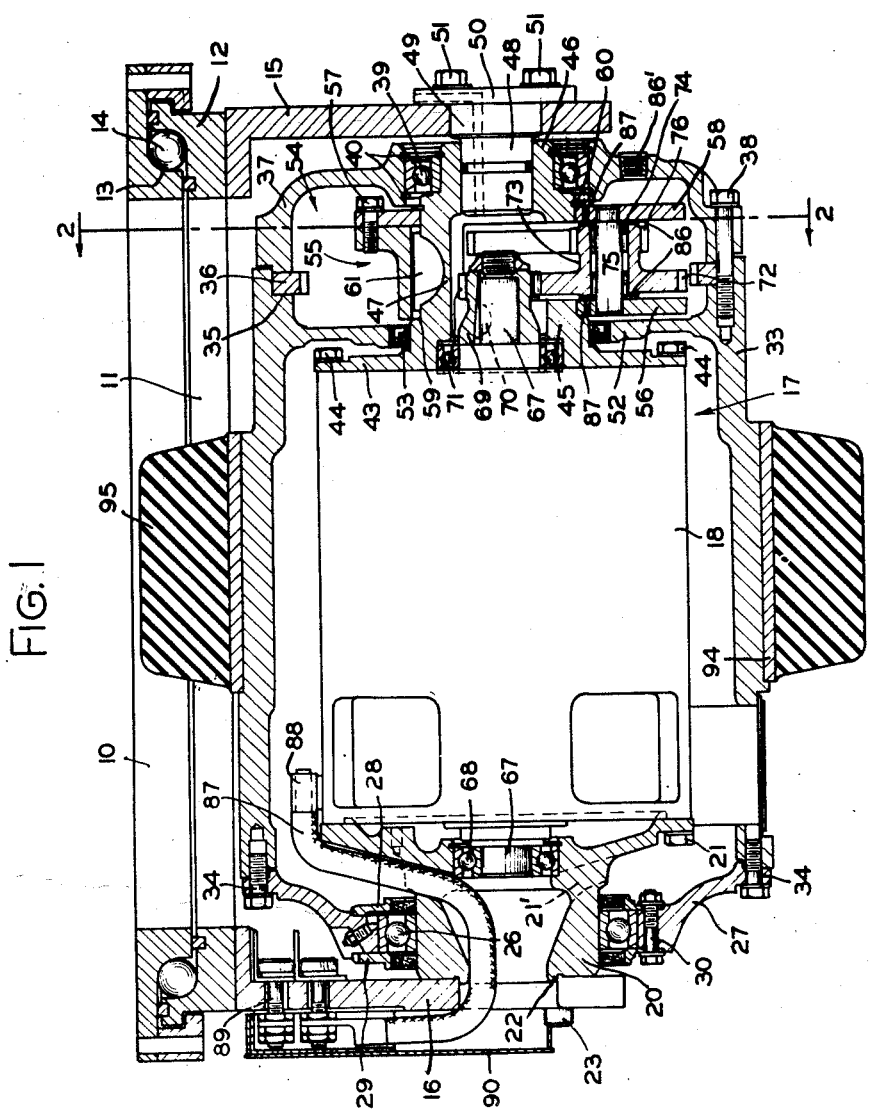
Figure 1 is a vertical sectional view taken along the lengthwise extending median plane of the motor-in-wheel construction of our present invention.
Figure 2:
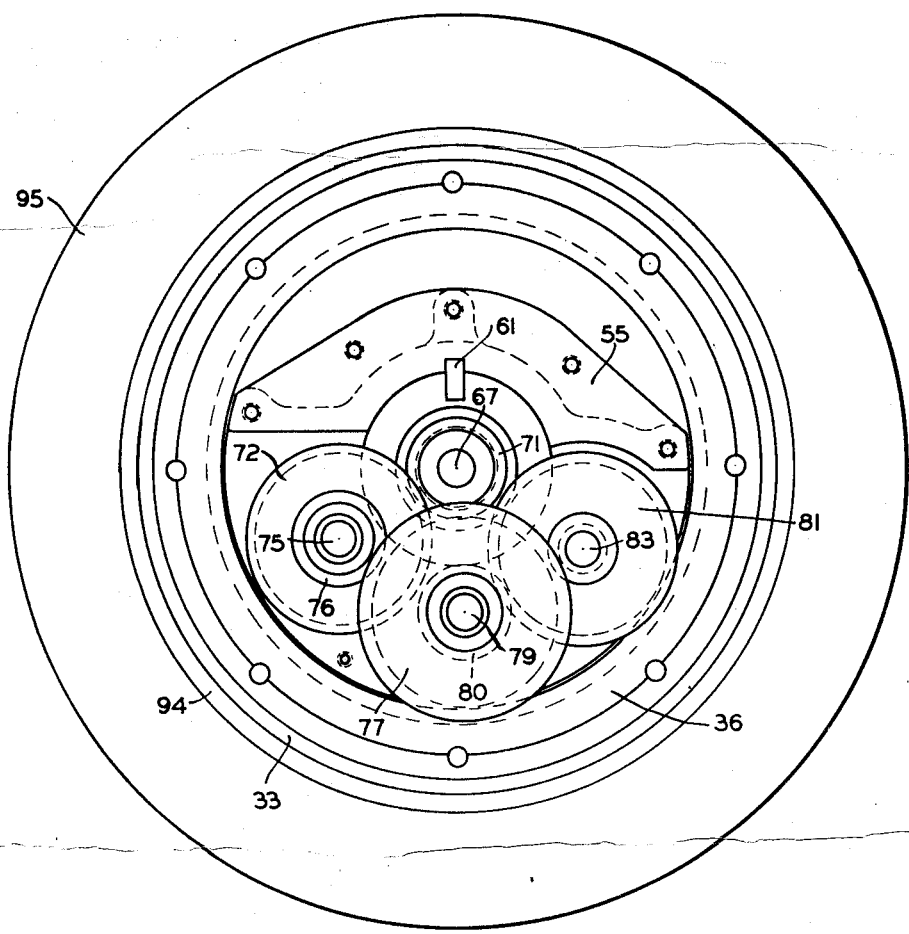
Figure 2 is a vertical transverse sectional view taken along the line 2—2 of Figure 1, looking in the direction indicated by the arrows, showing the drive means of our present invention.

Referring now to Figure 1, there is shown the motor-in-wheel construction of our present invention which may, for example, be adapted to rotatably support a horizontally extending frame member 10 of an industrial truck. The horizontally extending frame member 10 is adapted to be rotatably supported upon a horizontally extending circular ring member 11 which comprises a portion of the support means of the motor and wheel. The frame portion 11 is provided with an annular upwardly extending rim portion 12, which, at its uppermost end, has formed integrally therewith a laterally outwardly extending annular flange portion, which lateral flange portion is adapted to be received within a circumferentially continuous groove 13 formed inwardly of the edges of the frame member 10. Anti-friction balls 14 are provided between the frame members 10 and 11 for permitting relative rotation therebetween. Secured to the underside of the frame member 11, adjacent opposite edges thereof, are a pair of vertically downwardly extending plate members 15 and 16.

Disposed intermediate the plate members 15 and 16 is a prime mover, indicated generally by the reference numeral 17, which, for purposes of illustration, comprises an electric motor. The electric motor has a cylindrical casing 18 to which, at the left end thereof, as viewed in Figure 1, is secured, as by a plurality of circumferentially spaced bolts 21, an end cap member 20 having a portion extending axially of the armature shaft of the motor. The axially extending portion of the end cap member 20 has a central cavity formed therein, together with a plurality of radially extending circumferentially spaced openings 21' having connection with the central cavity. The axially extending portion of the end cap member 20, adjacent its outer end, is formed with an annular bead portion 22, which bead portion is adapted to seat within an opening formed in the plate member 16. The end cap member 20 is secured to the plate member 16 by means of a plurality of circumferentially spaced bolts 23. Mounted on the outer periphery of the axially extending portion of the end cap member 20 is a ball bearing assembly 26 which is adapted to rotatably support an end closure member 27. The hub of the end closure member 27 is maintained in concentric relation with respect to the ball bearing assembly 26, by means of circular retaining members 28 and 29 which are disposed one on each side of the ball bearing assembly 26 and are secured, as by a plurality of circumferentially spaced bolts 30, to the end closure member 27.

The end closure member 27 is adapted to provide a support for a lengthwise extending cylindrical wheel housing or casing 33, the cylindrical housing 33 being suitably secured to the outer peripheral edges of the end closure member 27, as by means of a plurality of circumferentially spaced bolts 34. The cylindrical housing 33 is disposed about the electric motor 17 in concentric relation thereto. The wheel housing 33, at its opposite end, is formed with an annular inwardly facing groove 35 which is adapted to receive an internal ring gear 36, which is held in position by an end closure member 37 secured to the cylindrical housing 33, as by means of a plurality of circumferentially spaced bolts 38. The ring gear member 36 is provided with circumferentially spaced semispherical notches at the outer periphery thereof, which notches are adapted to align with the bolts 38 for preventing rotation of the ring gear 36, with respect to the housing 33. The end closure member 37 is journaled on a ball bearing assembly 39 and is held against axial movement with respect thereto, by means of the spaced retaining rings 40.

Secured, as by bolts 44, to the casing 18 of the electric motor 17 is an end cap member 43 having a portion extending axially of the armature shaft of the motor. The axially extending portion of the end cap member 43 comprises a pair of coaxially aligned spaced apart cylindrical portions 45 and 46 which are interconnected adjacent their upper ends by means of an integrally formed web portion 47. The outer cylindrical portion 46 of the end cap member 43 is adapted to support the ball bearing assembly 39. Disposed within the outer cylindrical portion 46 is the reduced end portion of a pilot shaft 48. The pilot shaft 48 has an intermediate enlarged portion 49 which is adapted to be disposed within an opening formed in the plate member 15. The pilot shaft 48 has formed at its outer end an enlarged flange portion 50 which is adapted to be suitably secured to the outer surface of the plate member 15, by means of bolts 51.

It will also be observed that the above described support means permits the motor 17 and drive means to be removed easily for servicing. That is, by removing the pilot shaft 48 from the end cap member 43, and the bolts 23 which secure the end cap member 20 to the plate member 16, the motor and drive means may be shifted axially, permitting the bead portion 22 of the end cap member 20 to be withdrawn from the opening in the plate member 16. The motor and drive means may then be withdrawn from between the plate members 15 and 16.

Formed integrally with the cylindrical wheel housing 33, adjacent the right end of electric motor 17, as viewed in Figure 1, is a radially inwardly extending flange portion 52. A central opening is formed in the flange member 52 and an oil seal ring 53 is disposed between the inner periphery of the flange member 52 and the outer periphery of the inner cylindrical portion 45 of the axially extending portion of the end cap member 43. It will thus be observed that the inwardly extending flange member 52 and the end closure member 37 define a chamber 54 in which is disposed the drive means of our present invention.

Disposed within the cavity 54 is a substantially U-shaped inverted frame member 55 which, as best shown in Figures 6 and 7, comprises a vertical plate member 56 having a laterally extending web portion adjacent the upper end thereof, to which is secured, as by bolts 57, a vertically extending plate member 58. The plate members 56 and 58 are spaced at their lower ends by means of a spacer member 62 formed integrally with plate member 56 and bolted to plate member 58. The frame member 55 is adapted to be disposed over the web portion 47 of the axially extending portion of the end cap member 43 secured to the casing 18 of the electric motor 17. The frame member 55 is held against rotation, with respect to the end cap member 43, by means of a Woodruff key 61. The frame member 55 is held against axial movement in one direction by means of a shoulder 59 formed in the periphery of the inner cylindrical portion 45 of the end cap member 43, and in the other direction by means of a retaining ring 60 which is disposed within an annular groove formed in the outer cylindrical portion 46 of the end cap member 43.

As shown in Figure 7, three pair of circumferentially spaced openings 63, 64, and 65 are formed in the plate members 56 and 58 of the frame member 55. When the frame member 55 is assembled in position in the motor-in-wheel construction of our present invention, the openings 63 lie below a horizontal median plane passing through the output shaft 67, at one side of a vertical median plane passing through the output shaft 67; the openings 64 lie below the horizontal median plane in the vertical median plane; and the openings 65 lie below the horizontal median plane at the opposite side of the vertical median plane, as the openings 63. The openings 63, 64, and 65 are provided for a purpose to be hereinafter described.

Figure 3:
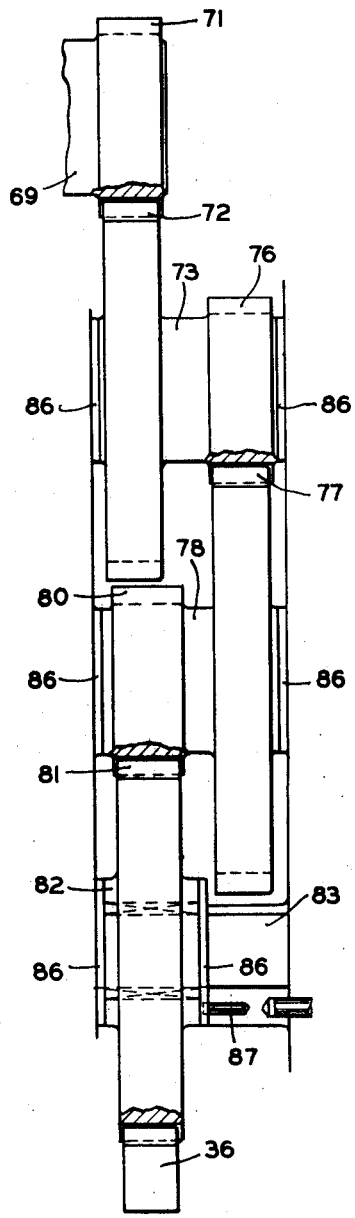
Figure 3 is a schematic view of the drive means of Figure 2.

Extending outwardly of the ends of the casing 18 of the electric motor 17 is a rotatable output shaft 67 which, at its left end, as viewed in Figure 1, is journaled within a ball bearing assembly 68 mounted in the cavity in the end cap member 20. The output shaft 67, at its other end, has secured thereon, as by a key 70, a pinion member 69. Referring now to Figure 3, there is shown the drive means of our present invention comprising a meshing gear train which, for the sake of clarity, is shown with the axes of the gears in one plane. The pinion member 69 has at its outer end a gear portion 71 which is adapted to have meshing engagement with the first gear portion 72 of a first compound gear member 73, rotatably journaled by means of needle bearings 74 on a lay shaft 75. The ends of the lay shaft 75 are disposed within the openings 63 formed in the frame member 55.

The first compound gear 73 has a second gear portion 76 which is adapted to have meshing engagement with the first gear portion 77 of a second compound gear member 78, which is rotatably journaled, as by means of needle bearings (not shown), on a lay shaft 79. The ends of the lay shaft 79 are disposed within the openings 64 in the frame member 55.

The second compound gear 78 has a second gear portion 80 which is adapted to have meshing engagement with a gear portion 81 of a gear member 82, which is rotatably journaled, as by means of needle bearings (not shown), on a lay shaft 83. The lay shaft 83 has its ends disposed within the opening 65 in the frame member 55. The gear portion 81 of the gear member 82 is adapted to have meshing engagement with the aforedescribed ring gear member 36, secured within the rotatable wheel housing 33.

It will thus be observed that drive is effected from the rotatable output shaft 67 of the electric motor 17 to the ring gear 36 of the rotatable wheel housing 33, by means of the pinion 71, gear portion 72, gear portion 76, gear portion 77, gear portion 80, and gear portion 81.

The gear members 73, 78, and 82 are axially spaced between plate members 56 and 58 of the frame member 55, by means of thrust washers 86, secured to the inner faces of the plate members 56 and 58, by means of pin members 87.

Since the chamber 54, defined by end closure member 37 and radially inwardly directed flange member 52, is substantially sealed against oil leakage, it will be understood that the gears disposed within the chamber 54 may be run continuously in an oil bath. A suitable drain plug member 86' is provided adjacent the lower end of the end closure member 37.

Figure 4:
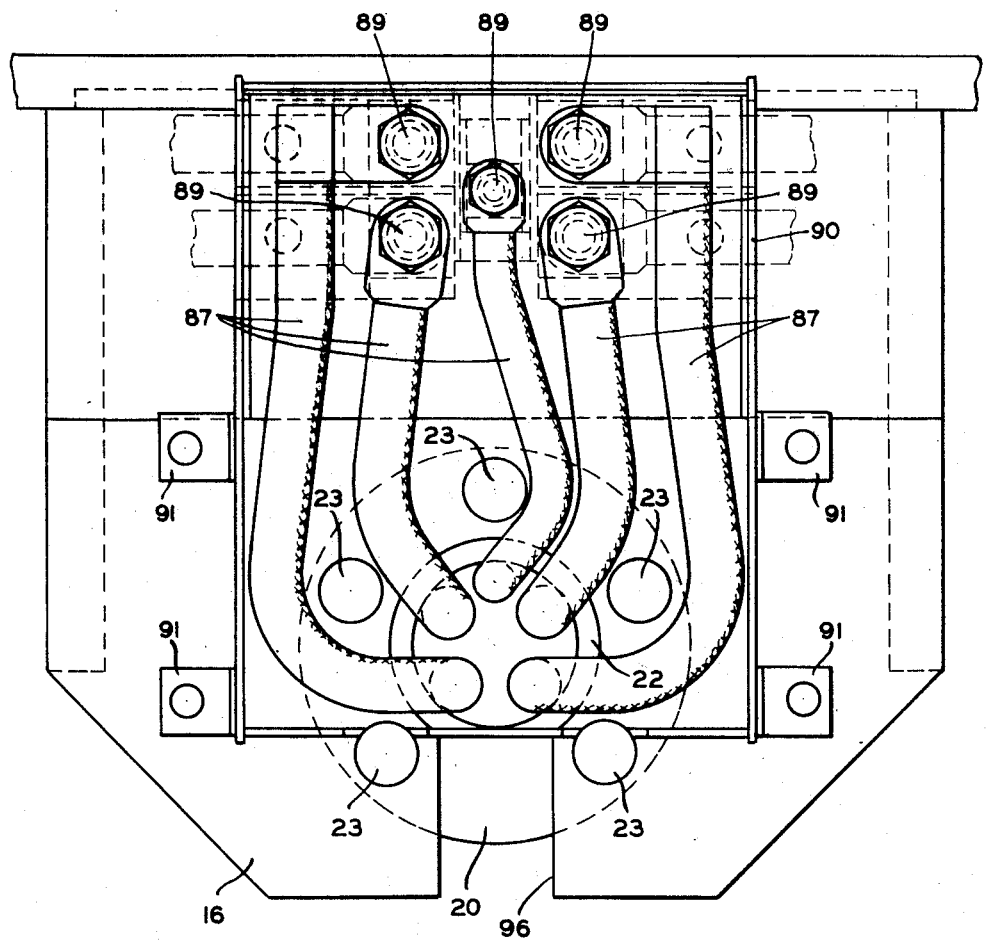
Figure 4 is a vertical end view showing the mounting terminals for the electrical cables of the motor-in-wheel construction shown in Figure 1.
Figure 5:
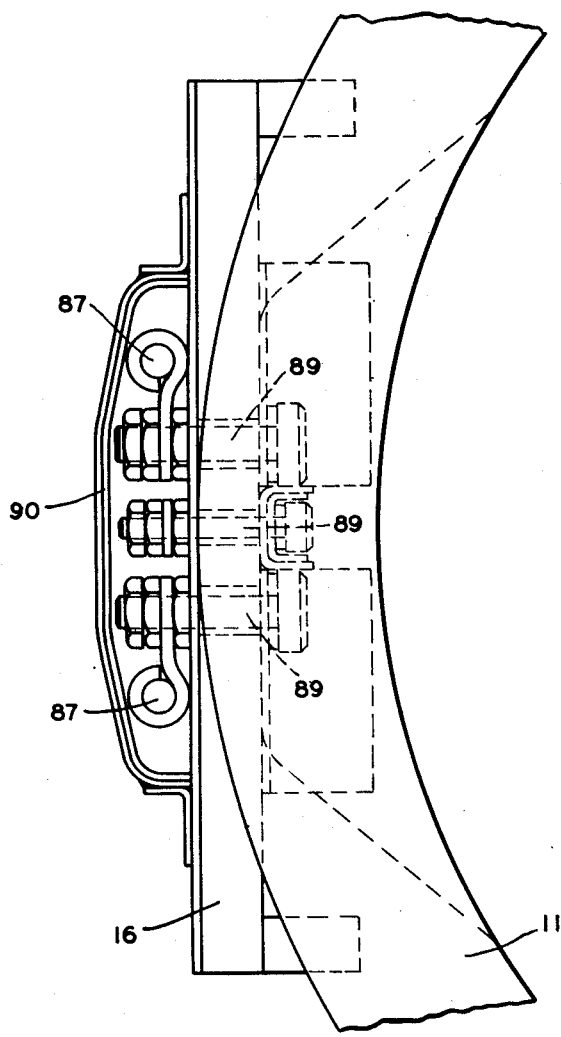
Figure 5 is a partial plan view of the motor-in-wheel construction of Figure 1 showing the mounting terminals for the power cables.

Electrical power is transmitted to the electric motor 17 through a plurality of cables 87 which are suitably secured to a plurality of circumferentially spaced terminals 88, secured to the casing 18 of the electric motor 17. The plurality of cables 87, as shown in Figure 1, extend through the openings 21' and central cavity formed in the end cap member 22, and out through the opening formed in the plate member 16. The free ends of the plurality of electrical cables 87 are then suitably secured to a plurality of terminals 89 provided adjacent the upper end of the plate member 16. The exposed portions of the terminals 89 and the cables 87 are enclosed by means of a closure member 90, which is suitably secured to the plate member 16 by means of a plurality of angle flange members 91, as shown best in Figure 4.

A slot 96 is formed at the lower end of plate member 16 and is provided so that the power cables 87, after being unsecured from the terminals 89, may be removed with the motor 17 when the latter and the drive means are being withdrawn from between the plate members 15 and 16.

Secured to the outer periphery of the rotatable wheel housing is a tire construction comprising a cylindrical sleeve 94 and a tire 95 for effecting drive from the rotatable wheel housing to the ground.

From the foregoing description, it will be realized that when the power is admitted through the cables 87 to the electric motor 17, the shaft 67 will rotate which will effect rotary movement of the pinion 71 which, through the gear portion 72, gear portion 76, gear portion 77, gear portion 80, gear portion 81, and ring gear 36, will cause rotation of the rotatable wheel housing 33. Since the casing 18 of the electric motor 17 is suitably secured to the spaced apart vertically downwardly extending plate members 15 and 16, through the end cap members 20 and 43, the casing 18 is held against rotation, which provides a suitable reaction point for driving the cylindrical housing 33.

While we have shown and described what we believe to be a preferred embodiment of our present invention it will be understood that various rearrangements and modifications may be made therein without departing from the spirit and scope of our present invention.

We claim:

1. A motor-in-wheel construction comprising a pair of vertically extending spaced apart plate members, a prime mover including a casing disposed intermediate said plate members, a pair of end cap members having axially extending portions one secured to each end of said casing, one of said end cap members having an annular bead formed at the outer end thereof adapted to seat within an opening formed in the adjacent plate member, the other of said end cap members having a central opening formed therein, a pilot shaft disposed through an opening in the plate member adjacent said last named end cap member and extending into the central opening therein, means for mounting said pilot shaft to said plate member, an output shaft extending from said prime mover, a rotatable housing disposed about said prime mover intermediate said plate members, drive means between said output shaft and said rotatable housing for effecting driving connection therebetween, and a tire mounted on said rotatable housing.

2. A motor-in-wheel construction comprising a pair of vertically extending spaced apart plate members, a prime mover including a casing disposed intermediate said plate members, a pair of end cap members having axially extending portions one secured to each end of said casing, one of said end cap members having an annular bead formed at the outer end thereof adapted to seat within an opening formed in the adjacent plate member, the other of said end cap members having a central opening formed therein, a pilot shaft having an intermediate portion disposed in an opening formed in the plate member adjacent said other end cap member, said pilot shaft having a reduced portion extending into the opening in said other end cap member, means for mounting said pilot shaft to said plate member, said other end cap member being axially spaced from the adjacent plate member, an output shaft extending from said prime mover, a rotatable housing disposed about said prime mover intermediate said plate members, drive means between said output shaft and said rotatable housing for effecting driving connection therebetween, and a tire mounted on said rotatable housing.

3. A motor-in-wheel construction comprising a pair of vertically extending spaced apart plate members, a prime mover including a casing disposed intermediate said plate members, a pair of end cap members having axially extending portions one secured to each end of said casing, means for mounting said end cap members to the adjacent plate members, a rotatable wheel housing disposed about said prime mover intermediate said plate members, said rotatable wheel housing comprising a cylindrical portion having a radially inwardly extending flange adjacent one end thereof, an end closure member secured to said one end of said cylindrical portion, said radially inwardly extending flange and said end closure member defining a chamber, an output shaft extending from said prime mover into said chamber, and drive means disposed in said chamber for effecting driving connection between said output shaft and said rotatable wheel housing.

4. A motor-in-wheel construction comprising a pair of vertically extending spaced apart plate members, a prime mover including a casing disposed intermediate said plate members, a pair of end cap members having axially extending portions one secured to each end of said casing, means for mounting said end cap members to the adjacent plate members, a rotatable wheel housing disposed about said prime mover intermediate said plate members, said rotatable wheel housing comprising a cylindrical portion having a radially inwardly extending flange adjacent one end thereof, an end closure member secured to said one end of said cylindrical portion, said end closure member being journaled on the axially extending portion of the adjacent end cap member, a ring gear interposed between said cylindrical portion and said end closure member, said radially inwardly extending flange and said end closure member defining a chamber, an output shaft extending from said prime mover into said chamber, drive means disposed in said chamber for effecting driving connection between said output shaft and said ring gear, and a tire mounted on said rotatable wheel housing.

5. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions inter-connected by a web portion, means for mounting said end cap members to the adjacent plate members, an output shaft extending from said prime mover, a rotatable wheel housing disposed about said prime mover intermediate said plate members, and drive means intermediate said cylindrical portions for effecting driving connection between said output shaft and said rotatable wheel housing.

6. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions inter-connected by a web portion, a pilot shaft carried by the adjacent plate member disposed within the outer cylindrical portion of said one end cap member, means for mounting said other end cap member to said other plate member, an output shaft extending from said prime mover, a rotatable wheel housing disposed about said prime mover intermediate said plate members, drive means intermediate said cylindrical portions for effecting driving connection between said output shaft and said rotatable wheel housing, and a tire mounted on said rotatable housing.

7. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions inter-connected by a web portion, a pilot shaft carried by the adjacent plate member disposed within the outer cylindrical portion of said one end cap member, means for mounting said other end cap member to said other plate member, an output shaft extending from said prime mover through said inner cylindrical portion of said one end cap member, a rotatable housing disposed about said prime mover intermediate said plate members, drive means intermediate said cylindrical portions for effecting driving connection between said output shaft and said rotatable housing, and a tire mounted on said rotatable housing.

8. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions interconnected by a web portion, means for mounting said end cap members to the adjacent plate members, an output shaft extending from said prime mover, a rotatable wheel housing disposed about said prime mover intermediate said plate members, said rotatable wheel housing comprising a cylindrical portion having an end closure member secured to one end thereof, said end closure member being journaled on the outer cylindrical portion of said one end cap member, and drive means intermediate said cylindrical portions of said one end cap member for effecting driving connection between said output shaft and said rotatable wheel housing.

9. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions interconnected by a web portion, a pilot shaft carried by the adjacent plate member disposed within the outer cylindrical portion of said one end cap member, means for mounting said other end cap member to said other plate member, an output shaft extending from said prime mover, a rotatable wheel housing disposed about said prime mover intermediate said plate members, said rotatable wheel housing comprising a cylindrical portion having an end closure member secured to one end thereof, said end closure member being journaled on the outer cylindrical portion of said one end cap member, drive means intermediate said cylindrical portions of said one end cap member for effecting driving connection between said output shaft and said rotatable wheel housing, and a tire mounted on said rotatable housing.

10. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions inter-connected by a web portion, means for mounting said end cap members to the adjacent plate members, an output shaft extending from said prime mover through said inner cylindrical portion of said one end cap member, a rotatable wheel housing disposed about said prime mover intermediate said plate members, said rotatable wheel housing comprising a cylindrical portion having an end closure member secured to one end thereof, an internal ring gear interposed between said cylindrical portion of said rotatable wheel housing and said end closure member, said end closure member being journaled on the outer cylindrical portion of said one end cap member, drive means intermediate said cylindrical portions of said one end cap member for effecting driving connection between said output shaft and said rotatable wheel housing, and a tire mounted on said rotatable housing.

11. The motor-in-wheel construction of claim 10 wherein said drive means comprises a pinion secured to said output shaft and meshing gears between said pinion and said ring gear.

12. A motor-in-wheel construction comprising a pair of vertically extending spaced apart plate members, a prime mover including a casing disposed intermediate said plate members, a pair of end cap members having axially extending portions one secured to each end of said casing, means for mounting said end cap members to the adjacent plate members, an output shaft extending from said prime mover, a pinion on said output shaft, a rotatable wheel housing disposed about said prime mover intermediate said plate members, an internal ring gear carried by said rotatable wheel housing, a substantially U-shaped inverted frame member disposed over said one end cap member and secured thereto, three parallel spaced apart lay shafts, the ends of said lay shafts being journaled in the legs of said inverted U-shaped frame member, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, and a gear journaled on the third of said lay shafts having meshing engagement with said second gear portion of said second compound gear and having meshing engagement with said ring gear.

13. A motor-in-wheel construction comprising a pair of vertically extending spaced apart plate members, a prime mover including a casing disposed intermediate said plate members, a pair of end cap members having axially extending portions one secured to each end of said casing, means for mounting said end cap members to the adjacent plate members, an output shaft extending from said prime mover, a pinion on said output shaft, a rotatable wheel housing disposed about said prime mover intermediate said plate members, an internal ring gear carried by said rotatable wheel housing, a substantially U-shaped inverted frame member disposed over said one end cap member, three parallel spaced apart lay shafts, the ends of said lay shafts being journaled in the legs of said inverted U-shaped frame member, the first of said lay shafts lying below a horizontal median plane passing through said output shaft at one side of a vertical median plane passing through said output shaft, the second of said lay shafts lying below said horizontal median plane in said vertical median plane, the third of said lay shafts lying below said horizontal median plane at the opposite side of said vertical median plane as said first lay shaft, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, and a gear journaled on the third of said lay shafts having meshing engagement with said second gear portion of said second compound gear and having meshing engagement with said ring gear.

14. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions interconnected by a web portion, means for mounting said end cap members to the adjacent plate members, an output shaft extending from said prime mover through said inner cylindrical portion of said one end cap member, a rotatable wheel housing disposed about said prime mover intermediate said plate members, said rotatable wheel housing comprising a cylindrical portion having an end closure member secured to one end thereof, an internal ring gear interposed between said cylindrical portion of said rotatable wheel housing and said end closure member, said end closure member being journaled on the outer cylindrical portion of said one end cap member a substantially U-shaped inverted frame member, the bight portion of said U-shaped frame member being fixed to said web portion of said one end cap member, a pinion secured to said output shaft, three parallel spaced apart lay shafts, the ends of said lay shafts being journaled in the legs of said inverted U-shaped frame member, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, and a gear journaled on the third of said lay shafts having meshing engagement with said second gear portion of said second compound gear and having meshing engagement with said ring gear.

15. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions interconnected by a web portion, means for mounting said end cap members to the adjacent plate members, an output shaft extending from said prime mover through said inner cylindrical portion of said one end cap member, a rotatable wheel housing disposed about said prime mover intermediate said plate members, said rotatable wheel housing comprising a cylindrical portion having a radially inwardly extending flange adjacent one end thereof, an end closure member secured to said one end of said cylindrical portions, said end closure member being journaled on said one end cap member, a ring gear interposed between said cylindrical portion and said end closure member, said radially inwardly extending flange and said end closure member defining a chamber, a substantially U-shaped inverted frame member disposed in said chamber, the bight portion of said U-shaped frame member being fixed to said web portion of said one frame member, a pinion secured to said output shaft, three parallel spaced apart lay shafts, the ends of said lay shafts being journaled in the legs of said inverted U-shaped frame member, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, and a gear journaled on the third of said lay shafts having meshing engagement with said second gear portion of said second compound gear and having meshing engagement with said ring gear.

16. A motor-in-wheel construction comprising a pair of vertically extending spaced apart plate members, a prime mover including a casing disposed intermediate said plate members, a pair of end cap members one secured to each end of said casing, one of said end cap members comprising a pair of coaxially aligned spaced apart cylindrical portions interconnected by a web portion, means for mounting said end cap members to the adjacent plate members, an output shaft extending from said prime mover through said inner cylindrical portion of said one end cap member, a rotatable wheel housing disposed about said prime mover intermediate said plate members, said rotatable wheel housing comprising a cylindrical portion having a radially inwardly extending flange adjacent one end thereof, an end closure member secured to said one end of said cylindrical portion, said end closure member being journaled on said one end cap member, a ring gear interposed between said cylindrical portion and said end closure member, said radially inwardly extending flange and said end closure member defining a chamber, a substantially U-shaped inverted frame member disposed in said chamber, the bight portion of said U-shaped frame member being fixed to said web portion of said one frame member, a pinion secured to said output shaft, three parallel spaced apart lay shafts, the ends of said lay shafts being journaled in the legs of said inverted U-shaped frame member, the first of said lay shafts lying below a horizontal median plane passing through said output shaft at one side of a vertical median plane passing through said output shaft, the second of said lay shafts lying below said horizontal median plane in said vertical median plane, the third of said lay shafts lying below said horizontal median plane at the opposite side of said vertical median plane as said first lay shaft, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, and a gear journaled on the third of said lay shafts having meshing engagement with said second gear portion of said second compound gear and having meshing engagement with said ring gear.

17. A motor-in-wheel construction comprising, a pair of vertically extending spaced apart plate members, a prime mover including a casing disposed intermediate said plate members, a pair of end cap members having axially extending portions one secured to each end of said casing, one of said end cap members having an annular bead formed at the outer end of the axially extending portion adapted to seat within an opening in the adjacent plate member, a central cavity formed in said one end cap member, a plurality of radially extending openings formed in said one end cap member connecting with said central cavity, power lines extending through said cavity and radially extending openings and having connection with said prime mover for effecting operation of the latter, the axially extending portion of the other of said end cap members comprising a pair of coaxially aligned spaced apart cylindrical portions interconnected by a web portion, said other end cap member being axially spaced from the adjacent plate member, a pilot shaft having an intermediate portion disposed in an opening formed in the plate member adjacent said other end cap member, said pilot shaft having a reduced portion extending into the opening in the outer cylindrical portion of said other end cap member, means for mounting said pilot shaft to said plate member, an output shaft extending from said prime mover through said inner cylindrical portion of said other end cap member, a rotatable wheel housing disposed about said prime mover intermediate of said plate members, said rotatable wheel housing comprising a cylindrical portion having a radially inwardly extending flange adjacent one end thereof, an end closure member secured to said one end of said cylindrical portion, said end closure member being journaled on the outer cylindrical portion of said other end cap member, a ring gear interposed between said cylindrical portion and said end closure member, said radially inwardly extending flange and said end closure member defining a chamber, a substantially U-shaped inverted frame member disposed in said chamber, the bight portion of said U-shaped frame member being fixed to said web portion of said other end cap member, a pinion secured to said output shaft, three parallel spaced apart lay shafts, the ends of said lay shafts being journaled in the legs of said inverted U-shaped frame member, the first of said lay shafts lying below a horizontal median plane passing through said output shaft at one side of a vertical median plane passing through said output shaft, the second of said lay shafts lying below said horizontal median plane in said vertical median plane, the third of said lay shafts lying below said horizontal median plane at the opposite side of said vertical median plane as said first lay shaft, a first compound gear journaled on the first of said lay shafts having a first gear portion meshing with said pinion, said first compound gear having a second gear portion, a second compound gear journaled on the second of said lay shafts having a first gear portion meshing with said second gear portion of said first compound gear, said second compound gear having a second gear portion, a gear journaled on the third of said lay shafts having meshing engagement with said second gear portion of said second compound gear and having meshing engagement with said ring gear, and a tire mounted on said rotatable wheel housing.

FREDERICK E. HAWKINS.
ROBERT LAPSLEY.
GEORGE L. TURNER.

REFERENCES CITED

The following references are of record in the file of this patent:

UNITED STATES PATENTS

| Number | Name | Date |
| --- | --- | --- |
| 513,859 | Anderson | Jan. 30, 1894 |
| 600,383 | Sherwood | Mar. 8, 1898 |
| 834,879 | Annable | Nov. 6, 1906 |
| 1,313,537 | Jones | Aug. 19, 1919 |
| 1,323,245 | Borkes | Dec. 2, 1919 |
| 2,066,779 | Himmel | Jan. 5, 1937 |
| 2,403,170 | Chapman et al. | July 2, 1946 |

FOREIGN PATENTS

| Number | Country | Date |
| --- | --- | --- |
| 514,020 | Great Britain | Oct. 27, 1939 |